United States Patent [19]
Wishneusky

[11] Patent Number: 5,588,145
[45] Date of Patent: Dec. 24, 1996

[54] METHOD AND ARRANGEMENT FOR CLOCK ADJUSTMENT USING PROGRAMMABLE PERIOD BINARY RATE MULTIPLIER

[75] Inventor: John A. Wishneusky, Bolton, Mass.

[73] Assignee: Cirrus Logic, Inc., Fremont, Calif.

[21] Appl. No.: 415,021

[22] Filed: Mar. 31, 1995

[51] Int. Cl.⁶ .................................................. G06F 1/08
[52] U.S. Cl. ............................................................. 395/555
[58] Field of Search ............................................ 395/550

[56] References Cited

U.S. PATENT DOCUMENTS

| | | | |
|---|---|---|---|
| 3,701,027 | 10/1972 | Belton, Jr. ............................. | 327/115 |
| 3,739,156 | 6/1973 | Gebelein, Jr. et al. ............. | 327/105 X |
| 4,819,164 | 4/1989 | Branson ............................ | 364/DIG. 1 |
| 5,410,683 | 4/1995 | Al-khairi .............................. | 395/550 |
| 5,414,391 | 5/1995 | Hori ..................................... | 331/16 |
| 5,479,644 | 12/1995 | Hongo ................................. | 395/550 |
| 5,506,982 | 4/1996 | Hotta et al. ....................... | 395/550 |

*Primary Examiner*—Thomas M. Heckler
*Attorney, Agent, or Firm*—Frank D. Nguyen

[57] ABSTRACT

A method and arrangement for adjusting a clock frequency to allow computer devices with different clock frequencies to operate together. The arrangement scales the input clock frequency to be scaled by any desired fraction by controlling both the numerator and denominator of the scaling fraction. Clock frequency adjustment is achieved by transforming the input clock frequency into a periodic clock frequency that is reset following a desired clock period and scaling this periodic clock frequency according to a desired divisor value to generate the desired clock frequency.

51 Claims, 6 Drawing Sheets

| ci | q | inc | co |
|---|---|---|---|
| 0 | 0 | 0 | 0 |
| 1 | 0 | 1 | 0 |
| 0 | 1 | 1 | 0 |
| 1 | 1 | 0 | 1 |

FIG. 7

| Ain | Bin | =in | =out |
|---|---|---|---|
| x | x | 0 | 0 |
| 0 | 0 | 1 | 1 |
| 0 | 1 | 1 | 0 |
| 1 | 0 | 1 | 0 |
| 1 | 1 | 1 | 1 |

FIG. 8

METHOD AND ARRANGEMENT FOR CLOCK ADJUSTMENT USING PROGRAMMABLE PERIOD BINARY RATE MULTIPLIER

TECHNICAL FIELD

This invention relates generally to the field of computer systems, and more particularly, to the use of programmable period binary rate multipliers (PPBRM) in varying the clock speed of a computer device to allow computer devices of different operating clock speeds to function together.

BACKGROUND OF THE INVENTION

Continuing advances in semiconductor technology have made feasible higher levels of integration and higher clock frequencies. As a result, existing computer integrated devices are increasingly being incorporated into larger, faster, and more diverse semiconductor chips such as peripheral hardware controllers. This allows a single chip to perform many different functions inclusively. One of many challenges in the integration of existing integrated devices into faster semiconductor chips is clock frequency compatibility. For numerous reasons including the limitation of the technology available at the time the existing integrated device was designed, an integrated device is more likely to operate at a slower clock frequency than the multi-functional chip incorporating such device.

The National Semiconductor PC87311 SuperI/O™ is an example of a larger, faster, and more diverse chip which incorporates an existing integrated device with different operating clock frequency, namely the National Semiconductor PC16C550 UART, in its architecture. The PC87311 is a multi-functional controller (i.e., disk and serial communication controller) with an operating clock frequency of 24 MHz. On the other hand, the PC16C550 UART is an asynchronous serial communications integrated device with an operating clock frequency of 1.8432 MHz. The PC16C550 UART includes a baudrate generator to generate one of many programmed serial baudrates. The baudrate generator utilizes driver software to program different baudrate values which are based on an allowable range of the operating clock frequency received from the PC16C550 UART.

To make the PC16C550 UART compatible with the PC87311, the PC87311 clock frequency is scaled down by a factor of 13 to produce a 1.84615 MHz output scaled clock frequency that is within 0.16% of the 1.8432 MHz operating clock frequency of the PC16C550 UART. As faster clock frequencies in higher integration semiconductor chips become available, however, greater flexibility in clock rate adjustment is needed to accommodate existing integrated devices such as the PC16C550 UART. More particularly, fractional clock rate adjustment is crucial in fine-tuning the output scaled clock frequency to within the allowable range of clock frequency of the existing integrated device.

The binary rate multiplier circuit (BRM) such as the Texas Instruments SN5497 and the SN7497 is used in digital-to-analog and analog-to-digital conversions. In the field of industrial process measurement, the BRM circuit has been used in measuring systems that have nonlinear sensors such as thermocouples. The BRM circuit modulates digital waveform input signals representing temperature measurements to approximate the nonlinear output characteristics of the thermocouples. Reference is now made to FIG. 1 which illustrates an overview of an industrial process measurement system 100 which incorporates an BRM for the purpose stated above.

Analog voltage signal 101 generated from the thermocouple is provided as input to analog-to-digital (A/D) converter 102 which converts analog signal 101 to digital clock signal 103. To perform this conversion, A/D converter 102 implements an integrated dual slope conversion scheme in which analog signal 101 is integrated over a designated time period. Next, the value of the integrated signal achieved following the designated time period is used as a starting point for integrating a reference signal until the integrated reference signal drops down to zero. The time required for the integrated reference signal to drop to zero is measured in terms of clock pulses which are then provided as digital waveform signal 103 to BRM circuit 104. In short, digital waveform signal 103 corresponds to the thermocouple's calibrated temperature measurement.

BRM circuit 104 modulates digital waveform signal 103 to conform to the thermocouple's voltage vs. temperature conversion curve over a desired operating temperature range. To conform digital waveform signal 103 to the known voltage vs. temperature curve, waveform 104 is scaled by known divisor values. FIG. 2 shows BRM circuit 104 used in industrial process measurement system 100. The BRM circuit 104 includes fixed period binary counter 201, programmable divisor register 202, and BRM logic 203 which couples divisor register 202 to period counter 201. BRM circuit 104 produces as its output scaled digital waveform signal 105.

Referring back to FIG. 1, scaled digital waveform signal 105 is provided as input to Fahrenheit-Celsius converter 106 to convert from waveform counts to temperature reading in either Fahrenheit or Celsius. Temperature reading 107 is then sent to display counter 108 for display purposes.

The limitation with the BRM that was used in industrial process measurement system 100 is that it has only one degree of freedom through the programmable divisor register. In other words, the BRM that was used in industrial process measurement system 100 has only one variable, the divisor register 202, for adjustment. This severely limits the amount of fine-tuning needed in scaling clock frequencies. It therefore makes the applicability of the BRM circuit to semiconductor chips incorporating computer integrated devices problematic.

OBJECTS AND SUMMARY OF THE INVENTION

Accordingly, one object of the present invention is to provide clock frequency adjustment between integrated devices with different operating clock frequencies.

Another object is to provide the capability for fractional clock rate adjustment for fine tuning purposes.

The above and other objects are satisfied by various aspects of the present invention, wherein briefly stated, one aspect of the present invention is an apparatus that can be used in scaling a first clock frequency output by a computer device clock to generate a second clock frequency. Included in the apparatus are: counter means responsive to a clock for counting pulses of a first clock frequency; first comparator means responsive to the counter means and a period count value for generating a periodic clock frequency; and second comparator means responsive to the periodic clock frequency and a divisor count value for scaling said periodic clock frequency to generate said second clock frequency.

Another aspect of the present invention is a computer system having an operating clock with a clock frequency that can be changed to accommodate different computer devices operating at different operating clock frequencies. The computer system includes a host processor for determining a period count value and a divisor count value based on said operating clock frequency and a desired clock frequency; a system memory responsive to said host processor for storing the values of said operating clock frequency and said desired clock frequency; a system bus for coupling said host processor to said system memory; a counter responsive to said operating clock for counting pulses of said operating clock frequency; a first comparator responsive to said counter and a period count value for generating a periodic clock frequency; and a second comparator responsive to said periodic clock frequency and a divisor count value for scaling said periodic clock frequency to generate a second clock frequency.

Another aspect of the present invention is a multi-functional integrated circuit having an operating clock with an operating clock frequency that can be scaled to different clock frequencies. The multi-functional integrated circuit includes a processor; a plurality of integrated devices responsive to said processor for performing different functions wherein said integrated devices operating at different clock frequencies; an internal bus for coupling said processor to said integrated devices; a counter responsive to said operating clock for counting pulses of said operating clock frequency; a first comparator responsive to said counter means and a period count value for generating a periodic clock frequency; and a second comparator responsive to said periodic clock frequency and a divisor count value for scaling said periodic clock frequency to generate a second clock frequency.

Still another aspect of the present invention is a method for scaling a first clock frequency output by a computer device clock to generate a desired second clock frequency comprising: keeping a count of said first clock frequency pulses; generating a periodic clock frequency by resetting said count of said first clock frequency upon said count reaching a desired period count value to generate a periodic clock frequency; keeping a count of said periodic clock frequency; and scaling the periodic clock frequency to a divisor count value to generate said second clock frequency.

Thus, the present invention fractionally scales the input clock frequency by controlling both the numerator and denominator of the fraction. This provides greater flexibility in clock rate adjustment which is required for computer integrated devices with different clock frequencies to operate together. More particularly, the present invention provides sufficient flexibility to fine-tune the output scaled clock frequency to within the required range of clock frequency.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is the truth table for d2i ripple carry binary logic.

FIG. 8 is the truth table for A=B? binary comparator logic.

DETAILED DESCRIPTION OF THE PREFERRED EMBODIMENT

Although the present invention is applicable in general to integrated devices with different operating clock frequencies, the best mode for practicing the invention is as part of a multi-functional chip such as a peripheral hardware controller that incorporates a slower integrated device to allow the controller chip to perform many different functions inclusively.

Figure 1:
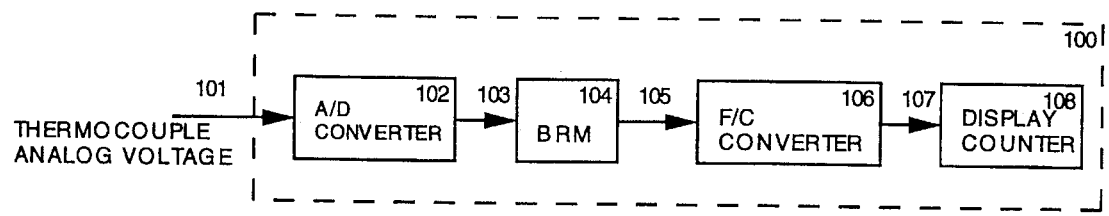
FIG. 1 depicts as prior art an industrial process measuring system that utilizes a BRM circuit for approximating the non-linear characteristics of thermocouples.
Figure 3:
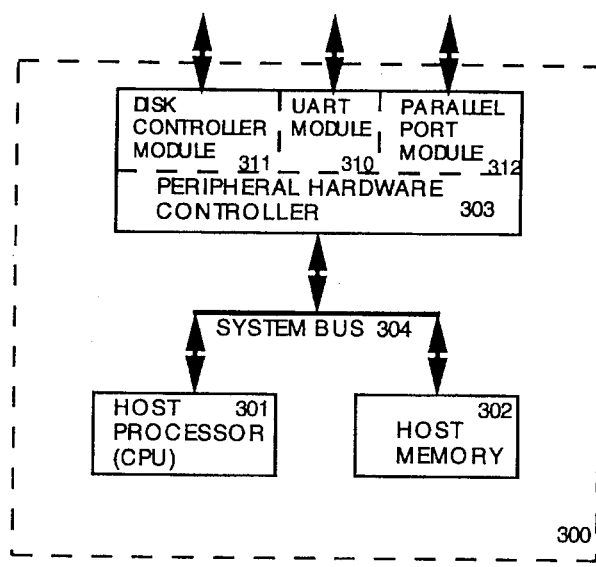
FIG. 3 is a block diagram of a computer system utilizing a peripheral hardware controller that incorporates the present invention.
Figure 2:
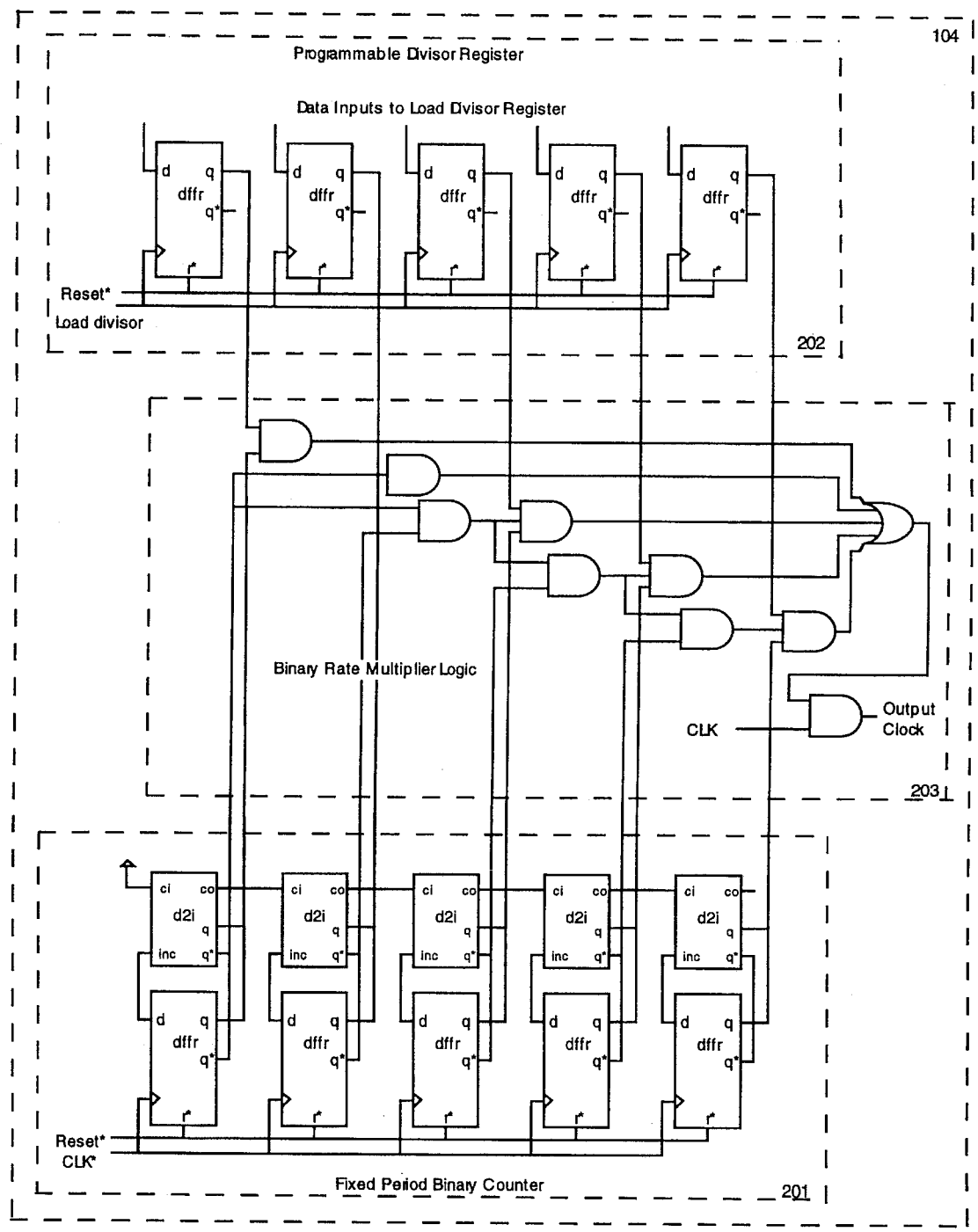
FIG. 2 illustrates in detail the prior art BRM circuit used in industrial process measuring systems.

FIG. 3 presents an overview of a typical computer system containing a multi-functional peripheral hardware controller that incorporates the present invention. In FIG. 3, computer system 300 comprises host CPU 301, host memory 302, and peripheral hardware controller 303. Peripheral hardware controller 303 is coupled to host CPU 301 and host memory 302 through system bus 304. Host CPU 301 may be any one of numerous commercially available microprocessors such as the types manufactured by Intel and Motorola. Peripheral hardware controller 303 is basically a front end processor that acts as the interface between the host CPU and external peripherals such as disk drives or communications devices. Peripheral hardware controller 303 handles most of the time-consuming details of shuttling data to and from peripheral devices, leaving host CPU 301 free for its main tasks of controlling the operation of other subsystems within the computer system and data processing. As such, peripheral hardware controller 303 may include UART communications module 310, disk controller module 311, and parallel port module 312.

Figure 4:
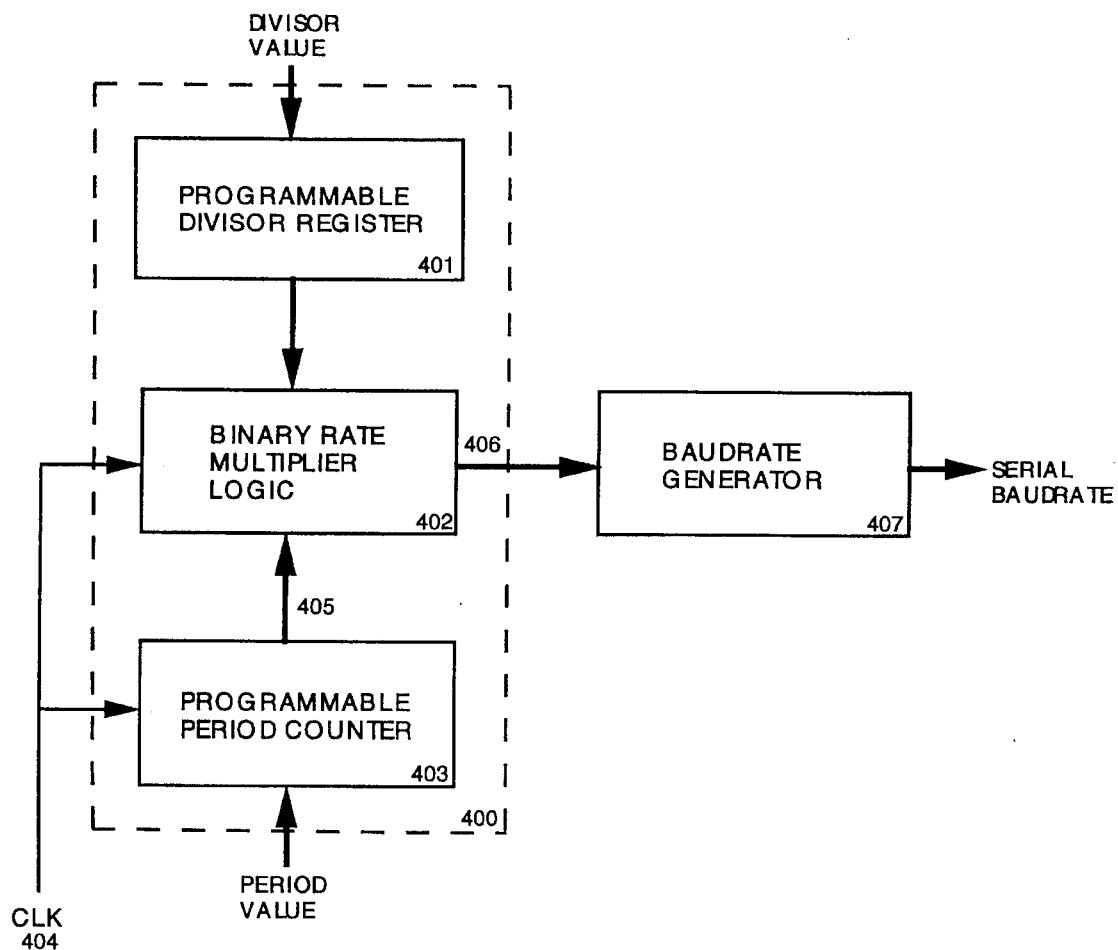
FIG. 4 is a system block diagram of the present invention.

Reference is now made to FIG. 4 which illustrates an exemplary embodiment of the invention implemented as part of UART communications module 310 inside peripheral hardware controller 303. As shown, period programmable binary rate multiplier 400 (the "PPBRM") of the present invention comprises programmable divisor register 401, BRM logic 402, and programmable period counter 403. Host CPU 301 retrieves data associated with the operating clock frequency and a desired clock frequency from host memory 302. From this information, host CPU 301 calculates the desired divisor count value and the period count value. Host CPU 301 provides programmable divisor counter 401 and programmable period counter 403 with the desired divisor value and period value respectively. Programmable period counter 403 also receives as input clock signal 404. Using the period value received from host CPU 301, programmable period counter 403 transforms input clock signal 404 into periodic clock count signal 405.

Divisor register 401 produces binary bits of the divisor value stored to BRM logic 402. Periodic clock count signal 405 is provided as another input to BRM logic 402 which matches the binary bits of periodic clock count signal 405 with that of divisor register 401. Using an inverted bit-matching scheme, BRM logic 402 selectively scales periodic clock count signal 405 to generate scaled clock frequency 406. Scaled clock frequency 406 is compatible with the existing driver software of baudrate generator 407 which is used to set the serial baudrate for UART communications module 310.

Figure 5:
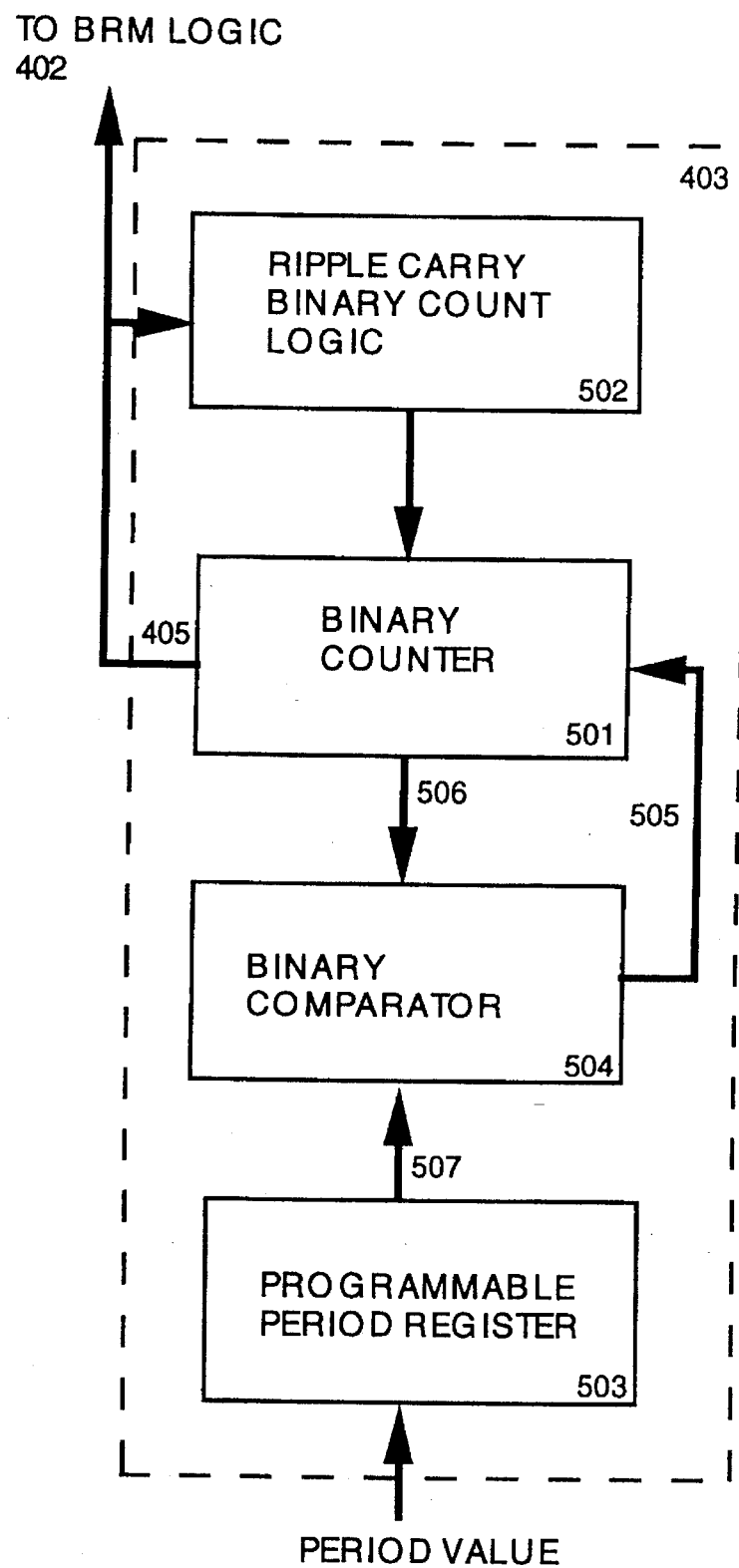
FIG. 5 is a block diagram of the programmable period counter.

FIG. 5 is a block diagram illustrating the components of programmable period counter 403. Programmable period counter 403 comprises binary counter 501, ripple carry binary count logic 502, programmable period register 503, and binary comparator 504. As shown in FIG. 5, the host CPU 301 loads the period value into programmable period register 503. Programmable period register 503 sends binary bits 507 of the period value to binary comparator 504 which compares binary bits 507 against binary clock count 506 received from binary counter 501. Binary counter 501 is a synchronously counter and requires the use of ripple carry binary count logic 502 in counting clock pulses. Immediately before binary clock count 506 reaches the programmed period value provided by programmable period register 503, binary comparator 504 generates signal 505 to reset binary counter 501. As a result, binary counter 501 produces periodic clock count signal 405 which is sent to BRM logic 402. It should be clear to a person with ordinary skill in the art that reset signal 505 can also be generated when binary clock count 506 actually reaches the programmed period value.

Figure 6:
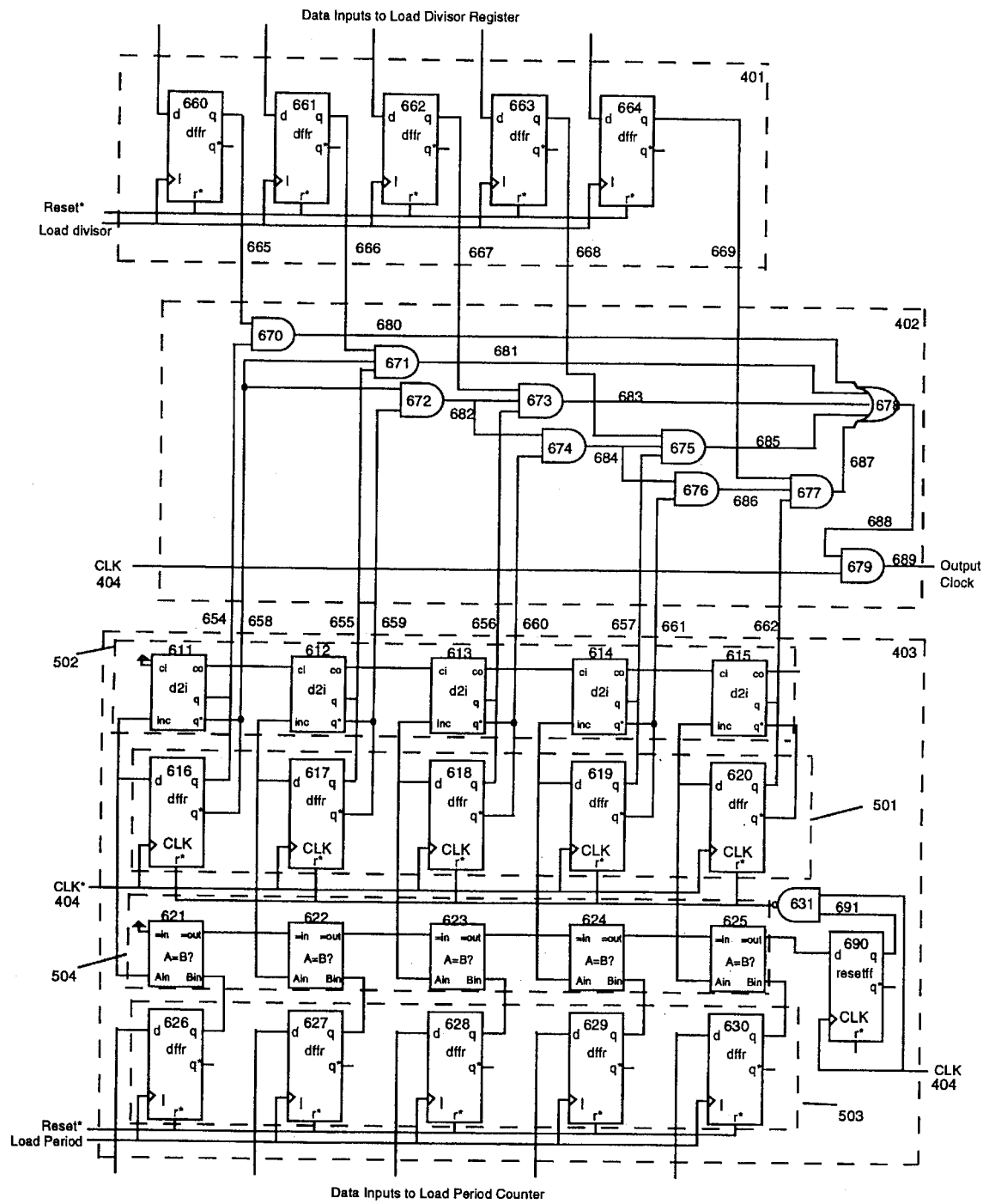
FIG. 6 illustrates a preferred embodiment of the present invention.

Reference is now made to FIG. 6 which provides a more detailed illustration of the PPBRM preferred embodiment. Binary counter 501 is a synchronous counter driven by clock frequency signal 404. As shown, binary counter 501 is a 5-bit gated latch comprising 5 D flip-flops. However, it should be clear to a person with ordinary skill in the art that binary counter 501 can be any N-bit gated latch, where N is an integer. Moreover, the gated latch can be made up of other types of flip-flops such as R-S. Each D flip-flop in binary counter 501 has data input d, clock input clk, complement reset input r* (activated by a low signal), data output q, and its complement data output q*. Furthermore, it should be clear to a person with ordinary skill in the art that binary counter 501 can also be an asynchronous counter.

Binary counter 501 monitors the pulse count of clock frequency signal 404 by counting the number of clock pulses received. The order of significance of the binary bits in binary counter 501 increases from left to right such that D flip-flop 616 represents the least significant bit and D flip-flop 620 represents the most significant bit. To allow binary counter 501 to operate synchronously, clock frequency signal 404 is provided as input to all D flip-flops 616–620. Ripple carry binary count logic 502 minimizes the ripple delay associated with D flip-flops 616–620 themselves taking into consideration the carry over signal from the previous flip-flop to the left. In short, ripple carry binary count logic 502 monitors the carry-over signal along with the corresponding D flip-flop's current data output value q to determine whether to generate a carry-over output.

Ripple carry binary count logic 502 comprises five d2i ripple logics 611–615. Each d2i ripple logic 611–615 has carry-in input ci, current-data input q, current-data complement input q*, carry-over output co, and increment output inc. Each d2i ripple logic of the ripple carry binary count logic 502 is exclusively assigned to a corresponding D flip-flop in binary counter 501. As such, d2i ripple logic 611 is assigned to D flip-flop 616, d2i ripple logic 612 is assigned to D flip-flop 617, etc.

FIG. 7 shows the d2i ripple carry binary logic truth table. As shown, increment output inc has a value of one when its carry-in input ci has a value of one and its current-data input q has a value of zero. Increment output inc also has a value of one when its current-data input q has a value of one and its carry-in input ci has a value of zero. On the other hand, carry-over output co has a value of one when both its carry-in input ci and its current-data input q have a value of one.

Each d2i ripple logic 611–615 is connected to its corresponding D flip-flop 616–20 as follows: the D flip-flop's data output q is provided as input to the d2i ripple logic's input q, the D flip-flop's data output q* is provided as input to the d2i ripple logic's input q*, the d2i ripple logic's output inc is provided as input to the D flip-flop's input d. These connections allow each d2i ripple logic 611–615 to monitor the data output value q of its corresponding D flip-flop 616–620 as well as to dictate the value of the flip-flop's data input d. In addition, each d2i ripple logic 611–615 is connected to the succeeding d2i ripple logic by providing its carry-over output co to the carry-in input ci of the next d2i ripple logic. This allows the carry-over signal from the immediately preceding flip-flop to be monitored. Because d2i ripple logic 611 does not have any preceding d2i ripple logic, its carry-in input ci is tied to Vcc. Similarly, because d2i ripple logic 615 does not have any succeeding d2i ripple logic, its carry-over output co is left open.

As an example of the interrelated operations of binary counter 501 and ripple carry binary count logic 502, consider the following sequence involving the two least significant binary bits of binary counter 501. First assume that binary counter 501 has been reset to "00000" (i.e., flip-flops 616–620 all have a value of zero at their data outputs q). Prior to the first clock pulse, because data input q of d2i ripple logic 611 is zero (i.e., flip-flop 616's data output q is provided as data input q of d2i ripple logic 611) while carry-in input ci is one (i.e., carry-in input ci of d2i ripple logic 611 is tied to a voltage source Vcc), increment output inc has a value of one and carry-over output co has a value of zero according to the d2i ripple logic truth table in FIG. 7. Since increment output inc of ripple logic 611 is fed to data input d of flip-flop 616, the value of one is passed through to flip-flop 616's data output q when the first clock pulse is received.

Applying the logic discussed above to flip-flop 617 and its corresponding d2i ripple logic 612, prior to the first clock pulse, because data input q of d2i ripple logic 612 is zero (i.e., flip-flop 617's data output q is provided as data input q of d2i ripple logic 612) while carry-in input ci is zero (i.e., the carry-over output co of d2i ripple logic 611 is provided as carry-in input ci of d2i ripple logic 612), increment output inc has a value of zero and carry-over output co has a value of zero according to the d2i truth table in FIG. 7. Since increment output inc of ripple logic 612 is fed to data input d of flip-flop 617, the value of zero is passed through to flip-flop 617's data output q when the first clock pulse is received. The logic discussed with respect to flip-flop 617 also applies to succeeding flip-flops 618–620 and their corresponding d2i ripple logics 613–615 as well. As a result, all carry-over output co of d2i ripple logics 613–615 and consequently all data outputs q of flip-flops 618–620 have a value of zero when the first clock pulse is received. Hence, binary counter 501 has the binary value of "10000".

After the first clock pulse but before the second clock pulse is received, because data input q of d2i ripple logic 611 is one (i.e., flip-flop 616's data output q is provided as data input q of d2i ripple logic 611) while carry-in input ci is one (i.e., carry-in input ci of d2i ripple logic 611 is tied to a voltage source Vcc), increment output inc has a value of zero and carry-over output co has a value of one according to the d2i ripple logic truth table in FIG. 7. Since increment output inc of ripple logic 611 is fed to data input d of flip-flop 616, the value of zero is passed through to flip-flop 616's data output q when the second clock pulse is received.

Regarding flip-flop 617 and its corresponding d2i ripple logic 612, after the first clock pulse but before the second clock pulse is received, because data input q of d2i ripple logic 612 is zero (i.e., flip-flop 617's data output q is provided as data input q of d2i ripple logic 612) while carry-in input ci is one (i.e., the carry-over output co of d2i ripple logic 611 is provided as carry-in input ci of d2i ripple logic 612), increment output inc has a value of one and carry-over output co has a value of zero according to the d2i truth table in FIG. 7. Since increment output inc of ripple logic 612 is fed to data input d of flip-flop 617, the value of one is passed through to flip-flop 617's data output q when the second clock pulse is receive.

With respect to flip-flop 618 and its corresponding d2i ripple logic 613, after the first clock pulse but before the second clock pulse is received, because data input q of d2i ripple logic 613 is zero (i.e., flip-flop 618's data output q is provided as data input q of d2i ripple logic 613) while carry-in input ci is zero (i.e., the carry-over output co of d2i ripple logic 612 is provided as carry-in input ci of d2i ripple logic 612), increment output inc has a value of zero and carry-over output co has a value of zero according to the d2i truth table in FIG. 7. Since increment output inc of ripple logic 613 is fed to data input d of flip-flop 618, the value of zero is passed through to flip-flop 618's data output q when the second clock pulse is received. The same logic discussed above applies to the succeeding flip-flops 619–620 and their corresponding d2i ripple logics 614–615 as well. As a result, all carry-over output co of d2i ripple logics 614–615 and consequently all data outputs q of flip-flops 619–620 have a value of zero when the first clock pulse is received. Hence, binary counter 501 has the binary value of "01000".

Period register 503 makes period counter 403 programmable. Programmable period register 503 is a 5-bit gated latch made up of 5 D-type flip-flops 626–630. However, it should be clear to a person with ordinary skill in the art that binary counter 501 can be any N-bit gated latch, where N is an integer. Moreover, the gated latch can be made up of other types of flip-flops such as R-S. The order of significance of the binary bits in period register 503 increases from left to right such that D flip-flop 626 represents the least significant bit and D flip-flop 630 represents the most significant bit. Each flip-flop in programmable period register 503 has data input d, load period input 1, complement reset input r* (activated by a low signal), data output q, and its complement data output q*. Host CPU 301 loads the desired period value in parallel into period register 501 via data inputs d. When a load signal is received at load period 1 input of flip-flops 626–630, the data input values at d are passed through to data output q. Data output q from each flip-flop 626–630 is provided as input to binary comparator 504.

Binary comparator 504 ensures that the count value in binary counter 501 does not quite reach the period count value in period register 503 by individually comparing the corresponding binary bits of binary counter 501 and period register 503. Binary comparator 504 comprises five A=B? comparators 621–625. Each A=B? comparator has data input Ain, data input Bin, enable input =in, and enable output =out.

FIG. 8 shows the truth table for A=B? comparators. As shown, when enable input =in is zero, A=B? comparator generates a zero at its =out output regardless of the values of Ain and Bin. Conversely, when enable input =in is one, A=B? comparator outputs a one whenever inputs Ain and Bin have the same value and a zero otherwise.

To compare the individual binary bits of binary counter 501 and period register 503, each A=B? comparator receives as its Bin input the data output q from its corresponding period register 503 flip-flop and the data input d from its corresponding binary counter 501 flip-flop as its Ain input. As discussed earlier, the data input d of each binary counter 501 flip-flop is connected to the increment output inc from its corresponding d2i ripple logic. As a result, binary comparator 504 resets binary counter 501 just before the count value in binary counter 501 reaches the period count value in period register 503.

Each A=B? comparator supplies its =out enable output to the =in enable input of the succeeding A=B? comparator. Since A=B? comparator 62 1 does not have a preceding A=B? comparator, its =in enable input is tied to a high voltage Vcc for enablement. On the other hand, the =out enable output of A=B? comparator 625 along with clock signal 404 are provided as input to D flip-flop 690 which is driven by input clock signal 404. D flip-flop 690 is used to produce a synchronous reset of binary counter 501. As such, output 691 of D flip-flop 690 along with input clock signal 404 are provided as inputs to NAND gate 631 whose output is supplied to complement reset input r* of flip-flops 616–620. Therefore, when there is a match between the binary bit of binary counter 501 and the corresponding binary bit of period register-503, the A=B? comparator doing the comparison produces a =out output value of one which in essence enables the succeeding A=B? comparator to perform the comparison. Conversely, when there is not a match, the output value =out is zero which essentially disables the succeeding A=B? comparators in a daisy-chained fashion so that no comparison in succeeding A=B? comparators is done.

The programmable divisor register 401 is a 5-bit gated latch made up of five D-type flip-flops 660–664. However, it should be clear to a person with ordinary skill in the art that divisor register 401 can be any N-bit gated latch, where N is an integer. Moreover, the gated latch can be made up of other types of flip-flops such as R-S. The order of significance of the binary bits in divisor register 401 decreases from left to right such that D flip-flop 660 represents the most significant bit and D flip-flop 664 represents the least significant bit. Each flip-flop in programmable divisor register 401 has data input d, load divisor input 1, complement reset input r* (activated by a low signal), data output q, and its complement data output q*. Host CPU 301 loads the desired divisor value in parallel into divisor register 401 via data inputs d. When a load signal is received at load divisor 1 input of flip-flops 660–664, the data input values at d are passed through to data output q. For programmable divisor register 401, data output q from flip-flops 660–664 is provided as outputs 665–669 respectively.

For rate multiplier binary counter 403, data output q and its complement data output q* from flip-flops 616–620 are provided as outputs 654–657 and 658–662 respectively. The complement data output q* for flip-flop 620 is not provided as an output to BRM logic 402. Outputs 665–669 from programmable divisor register 401 and outputs 654–663 from rate multiplier binary counter 403 are provided as inputs to BRM logic 402. BRM logic 402 implements an inverted matching scheme between the binary bits of programmable divisor register 401 and the binary bits of rate multiplier binary counter 403. In this inverted matching scheme, the most significant bit of programmable divisor register 401 is matched up with the least significant bit of rate multiplier binary counter 403 and the next most significant bit of programmable divisor register 401 is matched up with the next least significant bit of rate multiplier binary counter 403. This pattern applies to the remaining bits until the least significant bit of programmable divisor register 401 is matched up with the most significant bit of rate multiplier binary counter 403. A detailed description of BRM logic 402 is provided next.

As shown in FIG. 6, outputs 665 and 654 are coupled by AND gate 670 which produces output 680. Outputs 666, 655, and 658 are coupled by AND gate 671 which produces output 681. Outputs 658 and 659 are coupled by AND gate 672 which produces output 682. Outputs 656, 667, and 682 are coupled by AND gate 673 which produces output 683. Outputs 682 and output 660 are coupled by AND gate 674 which produces output 684. Output 657, 668, and 684 are coupled by AND gate 675 which produces output 685. Outputs 684 and 661 are coupled by AND gate 676 which produces output 686. Outputs 662, 669, and 686 are coupled by AND gate 677 which produces output 687. Outputs 680, 681, 683, 685, and 687 from AND gates 670, 671, 673, 675, and 677 respectively are coupled by OR gate 678 which produces output 688. Output 688 and clock signal 604 are coupled by AND gate 679 which produces scaled clock signal 689.

Under this inverted matching scheme, a clock pulse is produced when both the programmable divisor register 401 binary bit and its corresponding rate multiplier binary counter 403 binary bit have a value of one while all rate multiplier binary counter 403 bits of lesser magnitude with respect to the bit being compared are zero's. To generate a clock pulse when the corresponding bits of programmable divisor register 401 and rate multiplier binary counter 403 both have a value of one, the two bits are coupled to an AND gate. On the other hand, to prevent generating redundant clock pulses, comparator logic 402 will not generate a clock pulse unless all rate multiplier binary counter 403 bits of lesser magnitude than the bit being compared are zeros. To carry out this condition, comparator logic 402 provides complement bit outputs q* from rate multiplier binary counter 403 flip-flops 616–620 as additional inputs to AND gates coupling greater magnitude binary counter 403 bits.

As demonstrated above, the present invention allows for varying both the period value and the divisor value in scaling the input clock signal to generate the scaled output clock frequency. More specifically, a periodic clock frequency is generated based on the input clock signal and the desired period value. At the same time, the periodic clock frequency is scaled to the desired divisor value based on an inverted binary matching scheme.

In general, the present invention generates the scaled output clock frequency by multiplying the input clock signal by a scaling fraction. As such, the period value represents the denominator and the divisor value represents the numerator of the scaling fraction. For example, consider the example cited in the Background, in which a 24 MHz clock was divided by 13 to produce an input clock of 1.84615 MHz to the PC16C550 UART. Assume for the moment that the PC16C550 is now being incorporated into a multi-functional chip with an operating clock frequency of 36 MHz, the required scaling factor for direct conversion would be 19.53 which is impossible to achieve under the prior art. Under the present invention, a scaling fraction of 24/36 can be applied to the operating clock frequency of 36 MHz to generate an intermediate scaled output frequency of 24 MHz which would then be divided by 13 as before to produce a 1.84615 MHz clock which is within 0.16% of the 1.8432 MHz operating clock frequency of the PC16C550. This can be achieved under the present invention by programming the period register 503 to have a value of 36 and divisor register 401 to have a value of 24.

Although the present invention has been described and illustrated in detail, it is clearly understood that the same is by way of illustration and example only and is not to be taken by way of limitation, the spirit and scope of the present being limited only by the terms of the appended claims.

What is claimed is:

1. An apparatus for scaling a first clock frequency output by a computer device clock to generate a second clock frequency, comprising:

counter means responsive to said clock for counting pulses of said first clock frequency;

first comparator means responsive to said counter means and a period count value for generating a periodic clock frequency; and second comparator means responsive to said periodic clock frequency and a divisor count value for scaling said periodic clock frequency to generate said second clock frequency.

2. The apparatus of claim 1 wherein said counter means is a synchronous binary counter.

3. The apparatus of claim 2 wherein said counter means comprises:

a plurality of gated latches wherein each gate latch corresponds to a binary bit in said counter means; and a ripple carry binary count logic circuit connected to said gated latches to allow each of said gated latches to operate synchronously with each other.

4. The apparatus of claim 1 further comprising first storage means responsive to said counter means for storing said period count value.

5. The apparatus of claim 4 wherein said first storage means is programmable to store different period count values.

6. The apparatus of claim 5 wherein said first storage means has the same number of binary bits as said counter means.

7. The apparatus of claim 4 wherein said first comparator means compares said first clock frequency pulse count of said counter means to said period count value of said first storage means.

8. The apparatus of claim 7 wherein said first comparator means includes means for generating an output signal immediately before said first clock frequency pulse count reaching said periodic count.

9. The apparatus of claim 8 wherein said output signal resets said first counter means.

10. The apparatus of claim 1 further comprising second storage means coupled to said counter means for storing said divisor count value.

11. The apparatus of claim 10 wherein said second storage means is programmable to store different values of said divisor count.

12. The apparatus of claim 11 wherein said second storage means has the same number of binary bits as said counter means.

13. The apparatus of claim 12 wherein said second comparator means individually couples the binary bits of said second storage means to the binary bits of said counter means according to an inverted matching scheme in which the most significant bit of said second storage means is coupled to the least significant bit of said counter means, said inverted matching scheme applies to the remaining bits of said second storage means and said counter means until the least significant bit of said second storage means is coupled to the most significant bit of said counter means; said second comparator means producing a clock pulse when a bit of said second storage means and its corresponding bit from said counter means both have a value of one while all other bits of lesser significance from said counter means are zero.

14. The apparatus of claim 13 wherein said second comparator means includes AND-gates for coupling the binary bits of said second storage means to the binary bits of said counter means.

15. The apparatus of claim 14 wherein said second comparator means incorporates the complements of the binary bits of said counter means to ensure that no redundant clock pulse is generated.

16. The apparatus of claim 15 wherein said second comparator means includes an OR-gate that combines the clock pulses generated into one wave form constituting said second clock frequency.

17. A computer system having an operating clock with a clock frequency that can be changed to accommodate different computer devices operating at different operating clock frequencies comprising:
- a host processor for determining a periodic count value and a divisor count value based on said operating clock frequency and a desired clock frequency;
- a system memory responsive to said host processor for storing the values of said operating clock frequency and said desired clock frequency;
- a system bus for coupling said host processor to said system memory;
- a counter responsive to said operating clock for counting pulses of said operating clock frequency;
- a first comparator responsive to said counter means and a period count value for generating a periodic clock frequency; and
- a second comparator responsive to said periodic clock frequency and a divisor count value for scaling said periodic clock frequency to generate a second clock frequency.

18. The apparatus of claim 17 wherein said counter means is a synchronous binary counter.

19. The apparatus of claim 18 wherein said counter comprises:
- a plurality of gated latches wherein each gated latch corresponds to a binary bit in said counter means; and
- a ripple carry binary count logic circuit connected to said gated latches to allow each of said gated latches to operate synchronously and independently with each other.

20. The apparatus of claim 17 further comprising a first storing circuit responsive to said counter for storing said period count value.

21. The apparatus of claim 20 wherein said first storing circuit is programmable to store different values of said period count.

22. The apparatus of claim 21 wherein said first storing circuit has the same number of binary bits as said counter.

23. The apparatus of claim 17 wherein said first comparator compares said operating clock frequency pulse count of said counter to said period count value of said first storing circuit.

24. The apparatus of claim 23 wherein said first comparator generates an output signal immediately before said operating clock frequency pulse count reaching said periodic count.

25. The apparatus of claim 24 wherein said output signal resets said first counter.

26. The apparatus of claim 17 further comprising a second storing circuit coupled to said counter means for storing said divisor count value.

27. The apparatus of claim 26 wherein said second storing circuit is programmable to store different values of said divisor count.

28. The apparatus of claim 27 wherein said second storing circuit has the same number of binary bits as said counter means.

29. The apparatus of claim 28 wherein said second comparator individually couples the binary bits of said second storing circuit to the binary bits of said counter according to an inverted matching scheme in which the most significant bit of said second storing circuit is coupled to the least significant bit of said counter, said inverted matching scheme applying to the remaining bits of said second storing circuit and said counter until the least significant bit of said second storing circuit is coupled to the most significant bit of said counter; said second comparator producing a clock pulse when a bit of said second storing circuit and its corresponding bit from said counter both have a value of one while all other bits of lesser significance from said counter are zero.

30. The apparatus of claim 29 wherein said second comparator means includes AND-gates for coupling the binary bits of said second storing circuit to the binary bits of said counter.

31. The apparatus of claim 30 wherein said second comparator means incorporates the complements of the binary bits of said counter to ensure that said second comparator means only output one clock pulse at any one time.

32. The apparatus of claim 31 wherein said second comparator includes an OR-gate that combines the clock pulses generated into one wave form constituting said second clock frequency.

33. A multi-functional integrated circuit having an operating clock with an operating clock frequency that can be scaled to different clock frequencies comprising:
- a processor;
- a plurality of integrated devices responsive to said processor for performing different functions wherein said integrated devices operating at different clock frequencies;
- an internal bus for coupling said processor to said integrated devices;
- a counter responsive to said operating clock for counting pulses of said operating clock frequency;
- a first comparator responsive to said counter means and a period count value for generating a periodic clock frequency; and
- a second comparator responsive to said periodic clock frequency and a divisor count value for scaling said periodic clock frequency to generate a second clock frequency.

34. The apparatus of claim 33 wherein said counter means is a synchronous binary counter.

35. The apparatus of claim 34 wherein said counter comprises:
- a plurality of gated latches wherein each gated latch corresponds to a binary bit in said counter means; and
- a ripple carry binary count logic circuit connected to said gated latches to allow each of said gated latches to operate synchronously and independently with each other.

36. The apparatus of claim 33 further comprising a first storing circuit responsive to said counter for storing said period count value.

37. The apparatus of claim 36 wherein said first storing circuit is programmable to store different values of said period count.

38. The apparatus of claim 37 wherein said first storing circuit has the same number of binary bits as said counter.

39. The apparatus of claim 33 wherein said first comparator compares said operating clock frequency pulse count of said counter to said period count value of said first storing circuit.

40. The apparatus of claim 39 wherein said first comparator generates an output signal immediately before said operating clock frequency pulse count reaching said periodic count.

41. The apparatus of claim 40 wherein said output signal resets said first counter.

42. The apparatus of claim 33 further comprising a second storing circuit coupled to said counter means for storing said divisor count value.

43. The apparatus of claim 42 wherein said second storing circuit is programmable to store different values of said divisor count.

44. The apparatus of claim 43 wherein said second storing circuit has the same number of binary bits as said counter means.

45. The apparatus of claim 44 wherein said second comparator individually couples the binary bits of said second storing circuit to the binary bits of said counter according to an inverted matching scheme in which the most significant bit of said second storing circuit is coupled to the least significant bit of said counter, said inverted matching scheme applying to the remaining bits of said second storing circuit and said counter until the least significant bit of said second storing circuit is coupled to the most significant bit of said counter; said second comparator producing a clock pulse when a bit of said second storing circuit and its corresponding bit from said counter both have a value of one while all other bits of lesser significance from said counter are zero.

46. The apparatus of claim 45 wherein said second comparator means includes AND-gates for coupling the binary bits of said second storing circuit to the binary bits of said counter.

47. The apparatus of claim 46 wherein said second comparator means incorporates the complements of the binary bits of said counter to ensure that said second comparator means only output one clock pulse at any one time.

48. The apparatus of claim 47 wherein said second comparator includes an OR-gate that combines the clock pulses generated into one wave form constituting said second clock frequency.

49. A method for scaling a first clock frequency output by a computer device clock to generate a desired second clock frequency, said method comprising:

monitoring a count of said first clock frequency pulses;

generating a periodic clock frequency by resetting said count of said first clock frequency upon said count reaching a desired period count value to generate a periodic clock frequency;

monitoring a count of said periodic clock frequency; and scaling said periodic clock frequency to a divisor count value to generate said second clock frequency.

50. The method of claim 49 further comprising the step to determine said period count value and said divisor count value based on said first clock frequency and said second clock frequency.

51. The method of claim 50 wherein said scaling step comprises:

matching binary bits of said divisor count value to binary bits of said periodic clock frequency count according to an inverted matching scheme in which the most significant bit of said divisor count value is coupled to the least significant bit of said periodic clock frequency count, said scheme applying to the remaining bits of said divisor count value and said periodic clock frequency count until the least significant bit of said divisor count value is coupled to the most significant bit of said periodic clock frequency count; and generating a clock pulse when a bit of said divisor count and its corresponding bit from said periodic clock frequency both have a value of one while all other bits of lesser significance from said periodic clock frequency is zero.

* * * * *